United States Patent Office 3,359,258
Patented Dec. 19, 1967

3,359,258
PREPARATION OF DIETHYL AMINO ETHYL CELLULOSE
Bryan Atkinson Toms, Leamington Spa, England, assignor to Courtaulds Limited, London, England, a British company
No Drawing. Filed Feb. 3, 1965, Ser. No. 430,214
Claims priority, application Great Britain, Feb. 6, 1964, 5,031/64
4 Claims. (Cl. 260—231)

ABSTRACT OF THE DISCLOSURE

Diethyl amino ethyl cellulose is made by first reacting alkali cellulose and aminoethyl hydrogen sulphate to form amino ethyl cellulose which is then further reacted with diethyl sulphate in the presence of an acid binder.

In the specification

This invention is concerned with improvements in the manufacture of cellulose containing diethyl amino ethyl substituent groups and referred to herein as diethyl amino ethyl cellulose.

Diethyl amino ethyl cellulose is a rather expensive item of commerce. Its known uses are as an ion exchange material and as a material for blending with cellulose in the manufacture of a regenerated cellulose fibre having an increased affinity for acid dyestuffs. For example, in our co-pending United States Ser. No. 312,852, now Patent No. 3,305,337 there is described a viscose rayon fibre dyeable by acid dyes, this capability being due in part to diethyl amino ethyl cellulose.

We have examined some processes of making the amino ethers of cellulose employing the relatively cheap reagents, amino ethyl hydrogen sulphates and were surprised to find that diethyl amino ethyl hydrogen sulphate cannot be isolated from the standard reaction for making compounds of this kind, namely the condensation of diethyl amino ethanol with sulphuric acid. It is, therefore, difficult to introduce the diethyl amino ethyl group directly into cellulose using a sulphate derivative.

However, we have devised a two-stage process employing sulphate esters for the manufacture of diethyl amino ethyl cellulose.

According to the present invention a process for the manufacture of diethyl amino ethyl cellulose comprises reacting alkali cellulose and amino ethyl hydrogen sulphate to form amino ethyl cellulose and reacting the amino ethyl cellulose with diethyl sulphate in the presence of an acid binder.

An acid binder, in this specification, is a substance capable of removing an acid from the reaction, and is therefore, a base, for example an alkali metal hydroxide, such as sodium hydroxide.

Preferably the amino ethyl cellulose is dispersed in an aqueous solution of the acid binder and an amount of diethyl sulphate is added, sufficient to ethylate at least a proportion of the amino ethyl groups.

The alternative process of reacting ethyl amino ethyl hydrogen sulphate with cellulose to form ethyl amino ethyl cellulose, and in a subsequent step, completing the ethylation of the derivative with diethyl sulphate, is not as economically attractive as the present one, for crude amino ethyl hydrogen sulphate may be prepared in 92 percent yield, whereas the analogous ethyl amino ethyl hydrogen sulphate is obtained in only 73 percent yield.

When no special precautions are taken during the reaction of the amino ethyl hydrogen sulphate and the cellulose, we have found that at least a proportion of the amino ethyl cellulose is, unlike the parent cellulose, insoluble in caustic soda solutions after being reacted with carbon disulphide in the presence of caustic soda. A process which preserves the solubility of the amino ethyl cellulose under these conditions comprises forming a mixture of alkali cellulose and an aqueous solution of amino ethyl hydrogen sulphate, and heating and drying the mixture in a changing atmosphere at a pressure below atmospheric.

The reaction is preferably carried out at temperatures below 100° C. and at an air pressure of between 3 and 7 lbs./square inch. The atmosphere over the impregnated cellulose may be changed by allowing air to bleed into the partially evacuated chamber in which the process takes place.

The nitrogen content of the amino ethyl cellulose prepared in this way may be varied not only by altering the relative proportions of the reactants, but also by changes in the temperature and pressure employed in the process. The conditions for obtaining high nitrogen contents include the combination of a temperature in the range 60° to 70° C. with a pressure of from 5 to 7 pounds per square inch.

The amino ethyl cellulose prepared in this way may be incorporated with cellulose in the manufacture of acid-dyeing viscose rayon and the same is true of diethyl amino ethyl cellulose prepared by ethylating the amino ethyl cellulose with diethyl sulphate.

Diethyl amino ethyl cellulose of the same nitrogen content as amino ethyl cellulose has a greater capacity for binding acid dyes as the following examples show:

Example 1

(a) *Preparation of 2-amino ethyl hydrogen sulphate.*—
Monoethanol amine (1 mol 60 ml.) was added slowly and cautiously over 30 minutes to cold (0° to 5° C.) concentrated sulphuric acid (98 percent acid, 150 ml., 2.8 moles $H_2SO_4$), with thorough mixing and cooling in ice water. The homogeneous viscous solution was then set aside, in a tightly-stoppered flask, at room temperature (20° C.), for about 17 hours. (Alternatively, the reaction mixture was heated at 90° C., on a boiling water-bath, for 2 hours and then cooled.) It was then added slowly, with rapid stirring, to isopropanol or to industrial methylated spirit.

After 3 to 4 hours the crude amino ethyl hydrogen sulphate was filtered off, washed with isopropanol or industrial methylated spirit, and dried in air at room temperature. Yield—about 130 g. (92 percent).

The crude product, a white powder, was dissolved in warm water (500 ml.) and recrystallised by adding industrial methylated spirits (500 ml.). Yield—about 103 g. (73 percent on monoethanol amine).

Careful recrystallisation from ethanol-water gave colourless lath-shaped crystals which sintered and then melted, with decomposition at 276° to 278° C. (Found: N, 9.8. Calculated for $C_2H_7NO_4S$: N, 9.9 percent.)

(b) *Preparation of amino ethyl cellulose.*—A quantity of a freshly-prepared aqueous solution, four times the weight of the cellulose to be treated, and containing 25 percent of sodium hydroxide and 25 percent of amino ethyl hydrogen sulphate, was put into a tray and then a sheet of pulp was laid flat on the liquid surface. The whole of the solution was quickly absorbed by the pulp. During steeping, the sheet was gently pressed down, and then turned over, in order to wet it as evenly as possible. The damp sheet was removed from the tray after about 5 minutes and then heated, either intact or after shredding.

The impregnated pulp, whether in the form of sheet or crumb, was dried and baked under controlled conditions in a large electrically-heated air oven equipped with forced ventilation (a fan impelled heated air into the working chamber and the effluent gases escaped through a chimney). The air temperature inside the working chamber was kept substantially constant at 105° C. ±3° by thermostatic control.

For crumb two hours of drying and baking was ample, but impregnated sheet required longer, say about 4 hours, to reach maximum fixation of the amino groups.

After drying and baking, the sheet or crumb was finely dispersed in water by means of a mixer in which stainless steel cutters rotated at high speed. The insoluble fibrous material was then filtered off, and the yellow or yellow-brown filtrate discarded. The fibrous material was washed repeatedly with fresh water until it was no longer alkaline. The product was then coarsely crumbled and dried in air at 110° for several hours.

The amino ethyl cellulose was characterized by determining it nitrogen content using the micro-Kjeldahl method, the result, expressed as a percentage of the bone-dry weight, was 1.3 percent.

(c) *Ethylation of amino ethyl cellulose.*—Finely-divided amino ethyl cellulose (5 g. percent N=1.3) was dispersed in a solution of sodium hydroxide (4 g.) in water (200 ml.); diethyl sulphate (10 ml.) was then added and the slurry was shaken continuously, in a closed vessel, at room temperature (20° C.) for 17 hours.

The slurry was then mixed with an excess of dilute sulphuric acid; the insoluble cellulosic residue was filtered off, washed thoroughly with water, dried and pulverised.

(d) *Standard method of estimating the dye affinity of amino ethers of cellulose.*—0.02 g. of Azo Geranine 2 GS (C.I. 18,050), 0.05 g. of sodium sulphate and 0.02 g. of sulphuric acid were dissolved in 80 ml. of distilled water. The solution was put into a large boiling tube (100 ml. capacity) which was fitted with a vertical reflux condenser and placed in an oil-bath kept at 105° C. (±1°).

0.5 g. of the pulverised amino ether of cellulose was dispersed in the standard dye-bath and the suspension was agitated continuously by means of a reciprocating stirrer inserted through the reflux condenser. Dyeing was carried out, at the boil, for 4 hours. Afterwards, the hot suspension was filtered quickly through a glass sinter (porosity 2) under vacuum.

An aliquot (10 ml.) of the cooled filtrate was then diluted to 1000 ml. with distilled water and the concentration of residual Azo Geranine was then determined colorimetrically. The percentage exhaustion of the dye-bath could then be calculated.

The amino ethyl cellulose prepared as above exhausted the dye-bath to the extent of 50 percent, whereas the bath was 75 percent exhausted in dyeing the diethyl amino ethyl cellulose derived from the same amino ethyl cellulose.

*Example 2*

The procedure given in Example 1 was repeated, but the ethylation reaction was allowed to proceed for one hour only. The product gave a dye-bath exhaustion of 60 percent.

*Example 3*

The procedure of Example 2 was followed, but the temperature of the ethylation reaction was held at 90° C., approximately. The product gave a dye-bath exhaustion of 67 percent.

*Example 4*

The procedure of Example 1 was repeated, but the sodium hydroxide component was omitted from the ethylation reaction mixture. The product gave a dye-bath exhaustion of 60 percent.

*Example 5*

The procedure of Example 1 was changed only in that 12 g. of sodium hydroxide was employed in the ethylation reaction. The product gave a dye-bath exhaustion of 65 percent.

*Example 6*

A procedure similar to that of Example 1 with the exception that only 2.5 ml. of diethyl sulphate was used in the ethylation reaction gave a product with a dye-bath exhaustion of 65 percent.

*Example 7*

An amino ethyl cellulose containing 0.54 percent of nitrogen was prepared using a smaller ratio of amino ethyl hydrogen sulphate to cellulose than that used in Example 1, otherwise the procedure given in Example 1 was closely followed. The dye-bath exhaustion of the diethyl amino ethyl cellulose was 47 percent, approximately, whereas the intermediate amino ethyl cellulose gave only a 32 percent dye-bath exhaustion.

*Example 8*

Air-dry wood pulp (105 parts) was impregnated with a solution consisting of water (250 parts), amino ethyl hydrogen sulphate (50 parts) and sodium hydroxide (45 parts). The impregnated pulp was converted to crumb which was spread thinly on a shelf of a vacuum oven maintained at 75° C. Air was withdrawn from the oven through an outlet connected to an air pump, whilst more was admitted through a bleed to maintain the pressure in the oven at about 7 pounds per square inch with a continuous stream of air passing across the crumb. Drying was continued for about 20 hours. The amino ethyl cellulose formed in this way was washed thoroughly with water and redried. The bone-dry product had a nitrogen content of 0.76 percent.

*Example 9*

The procedure of Example 8 was repeated using 65 parts of NaOH. The washed, dry product contained 1.14 percent of nitrogen.

*Example 10*

The procedure of Example 8 was repeated using 95 parts of NaOH. The washed, dry product contained 0.68 percent of nitrogen.

*Example 11*

Air-dry wood pulp sheet (105 parts) was impregnated with a solution consisting of water (250 parts), amino ethyl hydrogen sulphate (50 parts) and sodium hydroxide (75 parts). The impregnated pulp was converted to crumb which was dried in a vacuum oven maintained at 50° C. The oven was connected to a vacuum line and an air-bleed was arranged so that the air pressure in the oven was held at 4.2 pounds per square inch and a stream of air passed continuously over the crumb. Drying continued for 20 hours. After washing with water and redrying, the amino ethyl cellulose was found to contain 1.04 percent of nitrogen.

*Example 12*

The procedure of Example 11 was repeated except that the oven temperature was 60° C. The washed, dry product contained 1.27 percent of nitrogen.

*Example 13*

The procedure of Example 11 was repeated except that the oven temperature was 100° C. The washed, dry product had a nitrogen content of 0.69 percent.

*Example 14*

The procedure of Example 12 was followed at an air pressure of 10 pounds per square inch. The amino ethyl cellulose contained 0.86 percent of nitrogen.

What I claim is:

1. A process for the manufacture of diethyl amino ethyl cellulose comprising reacting alkali cellulose and amino ethyl hydrogen sulphate to form amino ethyl cellulose and reacting the amino ethyl cellulose with diethyl sulphate at a temperature above about 60° C., at an absolute pressure above about 3 lbs./sq. inch and in the presence of a substance capable of removing acid from the reaction.

2. A process as claimed in claim 1 in which the alkali cellulose and the amino ethyl hydrogen sulphate are reacted in a changing atmosphere at a pressure less than atmospheric pressure.

3. A process as claimed in claim 2 in which the reaction is carried out at a temperature of less than 100° C. and at a pressure of between 3 and 7 pounds per square inch.

4. A process as claimed in claim 3 in which the reaction temperature is between 60 and 70° C. and the pressure between 5 and 7 pounds per square inch.

No references cited.

DONALD E. CZAJA, *Primary Examiner.*

R. W. MULCAHY, *Assistant Examiner.*